United States Patent [19]

Martin et al.

[11] Patent Number: 5,228,997
[45] Date of Patent: Jul. 20, 1993

[54] AEROBIC BIOLOGICAL NITRIFICATION USING BIOMASS GRANULATES

[75] Inventors: Guy Martin; Gilbert Blanchard, both of Cesson Sevigne; Michel Pouillot, Ville d'Avray, all of France

[73] Assignee: Atochem, Puteaux, France

[21] Appl. No.: 628,358

[22] Filed: Dec. 17, 1990

[30] Foreign Application Priority Data

Dec. 15, 1989 [FR] France ............................ 89 16642

[51] Int. Cl.⁵ .............................................. C02F 3/06
[52] U.S. Cl. ...................................... 210/610; 210/617; 210/903
[58] Field of Search ............................... 210/616–618, 210/610, 611, 903, 621, 631

[56] References Cited

U.S. PATENT DOCUMENTS

| | | | |
|---|---|---|---|
| 3,855,120 | 12/1974 | Garbo | 210/618 |
| 4,221,657 | 9/1980 | Lebesgue | 210/616 |
| 4,995,980 | 2/1991 | Jaubert | 210/617 |

FOREIGN PATENT DOCUMENTS 0328474 2/1989 European Pat. Off. .
2490623 9/1980 France .

*Primary Examiner*—Thomas Wyse
*Attorney, Agent, or Firm*—Burns, Doane, Swecker & Mathis

[57] ABSTRACT

Effluents contaminated with $NH_4^+$ values, e.g., domestic sewage, are purified by aerobic biological nitrification within a bed of biomass granulates, e.g., a fluidized bed, such granulates comprising a nitrification effective amount of at least one nitrifying microorganism firmly adhered to support, preferably carbonate granules consumable thereby.

14 Claims, 1 Drawing Sheet

AEROBIC BIOLOGICAL NITRIFICATION USING BIOMASS GRANULATES

BACKGROUND OF THE INVENTION

1. Field of the Invention

The present invention relates to the treatment of sewage and other effluents to remove ammoniacal nitrogen (or $NH_4^+$ ion) therefrom in high concentrations 2. Description of the Prior Art It is known to this art that ammoniacal nitrogen serves to promote the development of algae, and this can result in the eutrophication of rivers, streams and lakes, is toxic to aquatic fauna, accelerates the corrosion of pipes, especially those made from copper, and causes an increase in the chlorine demands and contact times required for proper sterilization of water which is to be rendered potable.

There exist a number of methods for removing ammoniacal nitrogen, the following being particularly representative:

(i) methods for the physicochemical treatment of sewage, such as oxidation/reduction of ammoniacal nitrogen, the removal of nitrogen compounds by precipitation, ion exchange or stripping;

(ii) biological treatments using nitrifying microorganisms responsible for aerobic nitrification of ammoniacal nitrogen.

By "nitrification" of $NH_4^+$ ions is intended the oxidation of the $NH_4^+$ ions to nitrite ($NO_2^-$) and/or nitrate ($NO_3^{2-}$) ions and, if desired, the oxidation of such nitrite ions to nitrate ions.

By "aerobic biological nitrification" are intended oxidation reactions such as described above, which occur in the presence of air and/or oxygen, using microorganisms (bacteria, etc.) that, in the presence of oxygen, serve to carry out said oxidation.

The "biomass" most typically employed is a mixture of nitriting bacteria (for example the Nitrosomonas) and of nitrating bacteria (for example Nitrobacters).

It is also possible to employ nitrifying bacteria, exemplary of which being *Arthrobacter globiformis, Aspergillus flavus* and *Aspergillus ventii.*

In the biological processes of aerobic nitrification, it is generally preferred to fix the microorganisms or biomass on a solid support in granular form; this makes it possible to attain higher biomass concentrations in the reactor and to prevent bacteria which are too light from being entrained out of the reactor.

The known supports are inert vis-a-vis the nitrifying activity of the biomass, namely, they do not take part in the nitrification.

Supports based on active charcoal, diatomaceous earths, sand, ceramics or glass beads are exemplary thereof.

SUMMARY OF THE INVENTION

Accordingly, a major object of the present invention is the provision of novel biomass supports that are also granular in form, but which functionally serve as a substrate for the nitrifying biomass, namely, they are actually consumed during the nitrification operation.

Briefly, the present invention features biomass supports/substrates based on carbonate(s) which are solid under the conditions of nitrification and which may be of natural origin or otherwise; for example $CaCO_3$, $MgCO_3$, dolomite, limestone, coral and preferably marl.

BRIEF DESCRIPTION OF THE DRAWING

The FIGURE of Drawing is a schematic/diagrammatic illustration of one embodiment of the process/apparatus according to the present invention.

DETAILED DESCRIPTION OF THE PREFERRED EMBODIMENTS OF THE INVENTION

Figure 1:
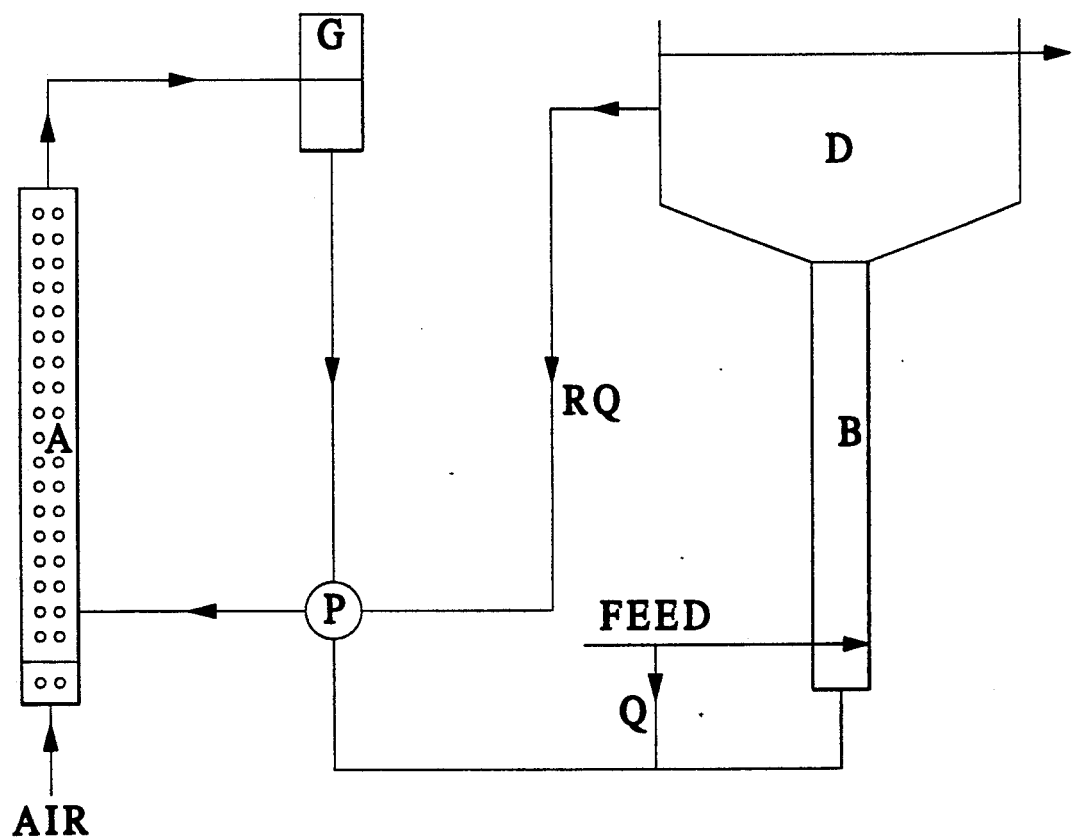

More particularly according to the present invention, the use of marl is preferred because it is relatively low in cost, does not disintegrate easily, has a high mechanical strength, and permits good adhesion o anchoring of the microorganisms thereto.

The biomass support in accordance with the present invention may be employed in any process for the aerobic nitrification of aqueous effluents as a replacement for the usual inert supports.

After introducing the support into the reactor where the nitrification of the effluents is carried out, said support is seeded with the biomass.

For such purpose, it is possible, for example, to use "active" nitrifying bacteria withdrawn from a nitrification reactor.

To accelerate the biomass seeding process, nutrient elements in liquid form, which are necessary for the growth and/or the maintenance of the microorganisms, are typically introduced into the effluents until a sufficiently thick layer of such microorganisms has been deposited and fixed onto the support, which is referred to as "sludge".

Exemplary such nutrient elements include the phosphates, magnesium, iron and copper, and some amino acids.

The oxygen requirements for the nitrification are partially provided by the presence of $CO_2$ ($HCO_3^-$, $CO_3^{2-}$), the remainder being provided by an aeration (or oxygenation) of the effluents to be nitrified, for example by bubbling air (or oxygen) directly into the reactor or by carrying out an external aeration (or oxygenation) of the effluents before they are introduced into the nitrification reactor (preaeration).

The support and the nitrifying sludge may form a stationary bed, but the active exchanges with the effluents are few in number and therefore not very efficient.

It is thus preferred to fluidize the bed, for example by recycling the effluents as an upward stream emanating from the base of the reactor.

The fluidization velocity must not be too high, or else the sludge may be stripped away from the support and removed from the reactor.

The designations are those of a "stirred bed", when the volume of expansion is less than 30% of its volume at rest, and of a "fluidized bed" when it is higher than 30%.

In a preferred embodiment of the aerobic nitrification process according to the invention, the bed is fluidized.

The nitrification process of the invention is particularly suitable for treating effluents in which the $NH_4^+$ concentration ranges from 15 to 500 mg/l.

In general, river waters have $NH_4^+$ concentrations on the order of one mg/l, domestic sewage contains a few tens of mg/l thereof, and industrial aqueous effluents, especially those emanating from chemical and agricultural and food processing industries, may contain several hundred mg/l of When the effluents are sufficiently rich in $NH_4^+$ (concentration higher than 100 mg/l), it is preferable to provide for a recycling of the effluents back into the reactor.

This recycling of the effluents may advantageously provide the means for expansion or fluidization of the bed.

The development and the growth of the nitrifying biomass require a basic pH, generally ranging from 7 to 9, but it has been determined that microorganisms can also develop at a pH close to 6.

The operating temperature typically ranges from 5° to 30° C., with the growth of bacteria increasing with temperature.

Two operating modes of the reactor are characteristic:

(i) when the residence time of the liquors in the reactor is short, the predominant chemical reaction is the conversion of aqueous ammonia into nitrite;

(ii) when the residence time of the liquors in the reactor is lengthy, conversion of aqueous ammonia into nitrite occurs, followed by conversion into nitrate.

It has also been determined that a high concentration of biomass in the reactor promotes the conversion of aqueous ammonia into nitrate, while a lower concentration promotes the conversion into nitrite.

Given that the carbonate serves as a substrate for the biomass, the support according to the invention is consumed in direct proportion with the progress of the nitrification of the effluents.

Care must therefore be taken that the substrate should be sufficient in amount, first to ensure support of the biomass and, secondly, such that the degree of nitrification of the effluents does not decrease significantly.

For this purpose, a nitrification process in accordance with the invention may be, for example, coupled with a biological denitrification process in which the bacterial activity produces nodules of calcium carbonate which can serve as a support for the nitrifying biomass. In such an installation, the denitrification reactor is situated upstream and the nitrification reactor downstream, so that it uses the calcium carbonate produced during the denitrification both as a support and as a substrate for the biomass.

In order to further illustrate the present invention and the advantages thereof, the following specific examples are given, it being understood that same are intended only as illustrative and in nowise limitative.

EXAMPLE 1

(A) Description of the Installation

The biological nitrification reactor, shown in the FIGURE of Drawing, included a column B, 1 m in height and 8 cm in diameter, supporting a settler D.

The effluents were introduced into the lower end of the column B and a fraction was recycled through the bottom of the column.

The preaeration of the effluents was carried out in a column A, identical with B, in which air was introduced at the base of the column and the effluents were recovered after debubbling in a debubbler G, from which one part was charged into the biological nitrification reactor, the other being recycled into the aeraion column A.

(B) Reactor Packing and Seeding 14 g/l of marl having a particle size ranging from 0.05 to 0.20 mm, i.e., 70 g, were introduced into the reactor.

The marl was a mixed calcium magnesium carbonate.

4.5 g of biomass were withdrawn from an operating biological nitrification facility and the reactor was then charged with a feed solution containing 40 mg/l of $(NH_4)_2CO_3$, 43 mg/l of $KHCO_3$, 37 mg/l of $K_2CO_3$ and 2 mg/l of P in the form of $KH_2PO_4$.

After 10 hours, the nitrification reactor was in a stationary state.

(C) Continuous Results

Measurements were made of the recycle velocity Uo (in m/h), the reactor feed rate Q (in l/h), the recycle flow rate (RQ) (in l/h), and the amount of biomass within the reactor Bi (in g/l).

Initial aqueous ammonia concentrations (expressed in mg/l of nitrogen) were measured:

(a) within the reactor: $N-(NH_4^+)_o$ $$N-(NH_4^+)_o \frac{(N-NH_4^+)_o + R \times N-(NH_4^+)f}{1+R}$$

(b) at the reactor inlet:

$$(N-NH_4^+)_o$$

and the $NH_4^+$, $NO_2^-$ and $NO_3^{2-}$ concentrations in the effluents (expressed in mg/l of nitrogen):

$$N-(NH_4^+)f, N-(NO_2^-)f \text{ and } N-(NO_3^{2-})f,$$

$NO_2^-$ being measured according to French Standard NF T 90-013 and $NO_3^{2-}$ according to French Standard NF T 90-012.

The results are reported in the following Table.

The reactor was employed as a fluidized bed (recycle velocity ranging from 4 to 8 m/h).

Operation of the reactor was monitored at initial aqueous ammonia concentrations ranging from 20 to 500 mg/l.

It was noted that in the case of an initial aqueous ammonia concentration on the order of 25 mg/l and a recycle ratio equal to approximately 7, a complete nitrification of aqueous ammonia was obtained. In the case of an initial aqueous ammonia concentration n the order of 25 mg/l and a recycle ratio equal to approximately 2, a good removal of $NH_4^+$ with predominant formation of $NO_3^{2-}$ was obtained, permitting the reactor to be operated in tandem with a denitrification reactor.

EXAMPLE 2

A reactor 60 l in volume and 2 m in height, having the same characteristics as that of Example 1, was employed, packed with marl of average particle size equal to 0.1 mm (marl concentration in the reactor: 7 g/l).

The reactor was operated as a fluidized bed (recycle velocity ranging from 4 to 8 m/h).

The operation of the reactor was monitored at initial aqueous ammonia concentrations ranging from 20 to 500 mg/l.

It was noted that in the case of an initial aqueous ammonia concentration on the order of 25 mg/l and a recycle ratio equal to approximately 7, a complete nitrification of aqueous ammonia was obtained. In the case of an initial aqueous ammonia concentration on the order of 25 mg/l and a recycle ratio equal to approximately 2, a good removal of $NH_4^+$ with predominant formation of $NO_3^{2-}$ was obtained, permitting the reactor to be operated in tandem with a denitrification reactor.

TABLE:

| Uo | Q | RQ | Bi | (N—NH$_4^+$)$_o$ | N—(NH$_4^+$)$_o$ | N—(NH$_4^+$)f | N—(NO$_2^-$)f | N—(NO$_3^{2-}$)f | Remarks |
|---|---|---|---|---|---|---|---|---|---|
| 8.4 | 1.9 | 42 | 22.5 | 100 | 62 | 60 | 18 | 8 | |
| 6.8 | to | 34 | 28 | 109 | 57.2 | 64.5 | 5 | 23 | |
| 5.4 | 2.2 | 27 | 32.5 | 105 | 44.5 | 40.2 | 1 | 40 | |
| 4 | | 20 | 36 | 100 | 28.5 | 28.5 | <0.1 | 58 | |
| 4 | 0.1 | 19 | 36 | 465 | 2.44 | <0.1 | 40 | 380 | Bi = 10 |
| | 0.2 | to | to | 490 | 2.56 | 0.1 | 210 | 230 | −0.66 Uo |
| | 0.3 | 22 | 35.3 | 500 | 11.40 | 4.8 | 340 | 110 | qdUo < 4 m/h |
| | 0.4 | | | 485 | 122 | 115 | 270 | 60 | |
| | 1 | 48 | 21.5 | 23 | | 0 | 0 | 23 | |
| | to | to | | 51 | | | | | |
| | 1.2 | 50 | | 71 | | 10 | 12 | 35 | |
| | | | | 93 | | 25 | 35→15 | 20→40 | |
| | | | | 254 | | 200 | 30 | 20 | |
| 4 | 2.5 | 17.5 | 35.5 | 25 | 3.53 | 0 | <0.1 | 21 | |
| | 5 | 15 | to | | 6.28 | 0.25 | 5 | 15 | |
| | 6 | 14 | 36 | | 9.75 | 3.4 | 8.1 | 10.5 | |
| | 8 | 12 | | | 15.25 | 8.7 | 13.5 | 1 | |
| | 10 | 10 | | | 18.60 | 12.2 | 10 | <0.5 | |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the aerobic biological nitrification of an effluent containing a contaminating amount of NH$_4^+$ values, which comprises establishing a bed of biomass granulates, said granulates comprising a nitrification effective amount of at least one nitrifying microorganism adhered to support granules which are consumed during nitrification, and then aerobically nitrifying such an effluent within said bed of biomass granulates.

2. The process as defined in claim 1, said bed of biomass granulates comprising a stirred bed.

3. The process as defined by claim 1, said bed of biomass granulates comprising a fluidized bed.

4. The process as defined by claim 1, said support granules comprising a solid carbonate consumable by said at least one microorganism.

5. The process as defined by claim 4, said carbonate comprising CaCO$_3$ and/or MgCO$_3$ values.

6. The process as defined by claim 5, said carbonate comprising marl.

7. The process as defined by claim 4, said solid carbonate comprising the nodules of an upstream biological denitrification.

8. The process as defined by claim 1, comprising recycling treated effluent back to said bed of biomass granulates.

9. The process as defined by claim 1, said biomass granulates further comprising a nutrient medium for said at least one microorganism.

10. The process as defined by claim 1, comprising bubbling air or oxygen through said bed of biomass granulates.

11. The process as defined by claim 1, said at least one microorganism comprising nitriting bacteria.

12. The process as defined by claim 1, said at least one microorganism comprising nitrating bacteria.

13. The process as defined by claim 1, said effluent comprising a wastewater, domestic sewage or an industrial aqueous effluent.

14. The process as defined by claim 1, carried out at a pH of from about 6 to 9.

* * * * *